United States Patent [19]
Victorov et al.

[11] Patent Number: 6,000,928
[45] Date of Patent: Dec. 14, 1999

[54] CAPSULE MAKING MACHINE HAVING IMPROVED PIN BARS AND AIR FLOW CHARACTERISTICS

[75] Inventors: Herman Victorov; Ioan Dumitru Balc, both of Windsor, Canada

[73] Assignee: Technophar Equipment & Service Limited, Ontario, Canada

[21] Appl. No.: 08/834,811

[22] Filed: Apr. 3, 1997

[51] Int. Cl.⁶ .......................... B29C 41/14; B29C 41/46
[52] U.S. Cl. .......................................... 425/270; 425/804
[58] Field of Search ................................ 425/270, 271, 425/275, 804, 96, 274

[56] References Cited

U.S. PATENT DOCUMENTS

| | | | |
|---|---|---|---|
| 297,380 | 4/1884 | Glover | 425/275 |
| 420,031 | 1/1890 | Bateson | 425/804 |
| 961,936 | 6/1910 | Colton et al. | 425/274 |
| 1,114,325 | 10/1914 | Winchester | 425/270 |
| 1,125,619 | 1/1915 | Winchester | 425/804 |
| 1,146,539 | 7/1915 | Winchester | 425/273 |
| 1,787,777 | 1/1931 | Colton | 425/274 |
| 1,978,829 | 10/1934 | Wilkie | 425/270 |
| 2,550,567 | 4/1951 | Kehoe et al. | 425/271 |
| 2,671,245 | 3/1954 | Kath | 425/274 |
| 2,975,477 | 3/1961 | Hostetler | 425/270 |
| 3,399,803 | 9/1968 | Oglevee et al. | 426/138 |
| 3,614,812 | 10/1971 | Ayres et al. | 425/376.1 |
| 3,617,588 | 11/1971 | Langman | 364/301 |
| 3,632,700 | 1/1972 | Oglevee | 425/269 |
| 3,794,453 | 2/1974 | Padilla et al. | 425/270 |
| 3,794,493 | 2/1974 | Sobel et al. | 430/512 |
| 3,802,272 | 4/1974 | Bischoff et al. | 73/866 |
| 3,842,242 | 10/1974 | Chisholm | 425/804 |
| 4,001,211 | 1/1977 | Sarkar | 264/301 |
| 4,026,986 | 5/1977 | Christen et al. | 264/301 |
| 4,061,859 | 12/1977 | Cheng | 536/88 |
| 4,196,564 | 4/1980 | Bodenmann et al. | 53/471 |
| 4,196,565 | 4/1980 | Bodenmann et al. | 156/305 |
| 4,247,006 | 1/1981 | Bodenmann et al. | 206/528 |
| 4,250,997 | 2/1981 | Bodenmann et al. | 206/528 |
| 4,268,265 | 5/1981 | Von Wattenwyl | 8/438 |
| 4,576,284 | 3/1986 | Wittwer et al. | 206/530 |

(List continued on next page.)

FOREIGN PATENT DOCUMENTS

| | | |
|---|---|---|
| 1151823 | 8/1983 | Canada . |
| 056825 | 8/1982 | European Pat. Off. . |
| 672275 | 12/1929 | France . |
| 693174 | 11/1930 | France . |
| 2339059 | 2/1974 | Germany . |
| 2722805 | 11/1978 | Germany . |
| 2025270 | 1/1980 | United Kingdom . |
| 2214516 | 9/1989 | United Kingdom . |
| WO 92/21311 | 12/1992 | WIPO . |

OTHER PUBLICATIONS

Technophar Equipment & Service Ltd. Drawing of "Hard Gelatin Capsule Machine", General Assembly, Model No. Two–Deck–Tes/E, Drawing No. 03140, offered for sale prior to Apr. 1997.

Technophar Equipment and Service Limited Brochure, prior to Apr. 3, 1997, entire document.

Technophar Publication including background and overview information on the capsule manufacturing process, prior to Apr. 3, 1997, entire document (25 pages).

*Primary Examiner*—Robert Davis
*Attorney, Agent, or Firm*—Harness, Dickey & Pierce, P.L.C.

[57] ABSTRACT

A capsule making machine includes a pin bar having a set of passageways disposed so as to allow free passage of fluid through a base. In another aspect of the present invention, a hood having a substantially triangular side view shape is disposed within the capsule hardening station for dispersing fluid upon the pin bars to promote hardening of the capsules. Another aspect of the present invention provides specific heating temperature ranges within predetermined section of the capsule hardening station. Methods of constructing a pin bar and for operating a capsule making machine are also provided within the present invention.

21 Claims, 12 Drawing Sheets

U.S. PATENT DOCUMENTS

| | | | |
|---|---|---|---|
| 4,591,475 | 5/1986 | Tomka et al. | 264/328.14 |
| 4,627,808 | 12/1986 | Hughes | 425/270 |
| 4,636,165 | 1/1987 | Roast | 425/274 |
| 4,758,149 | 7/1988 | Sauter | 425/275 |
| 4,997,359 | 3/1991 | Lebrun | 425/269 |
| 5,032,074 | 7/1991 | Muto et al. | 425/272 |
| 5,112,559 | 5/1992 | Lebrun | 264/306 |
| 5,271,881 | 12/1993 | Redding, Jr. | 425/804 |
| 5,427,614 | 6/1995 | Wittwer et al. | 106/213 |
| 5,698,155 | 12/1997 | Grosswald et al. | 425/272 |
| 5,750,157 | 5/1998 | Grosswald et al. | 425/143 |
| 5,756,036 | 5/1998 | Grosswald et al. | 425/270 |

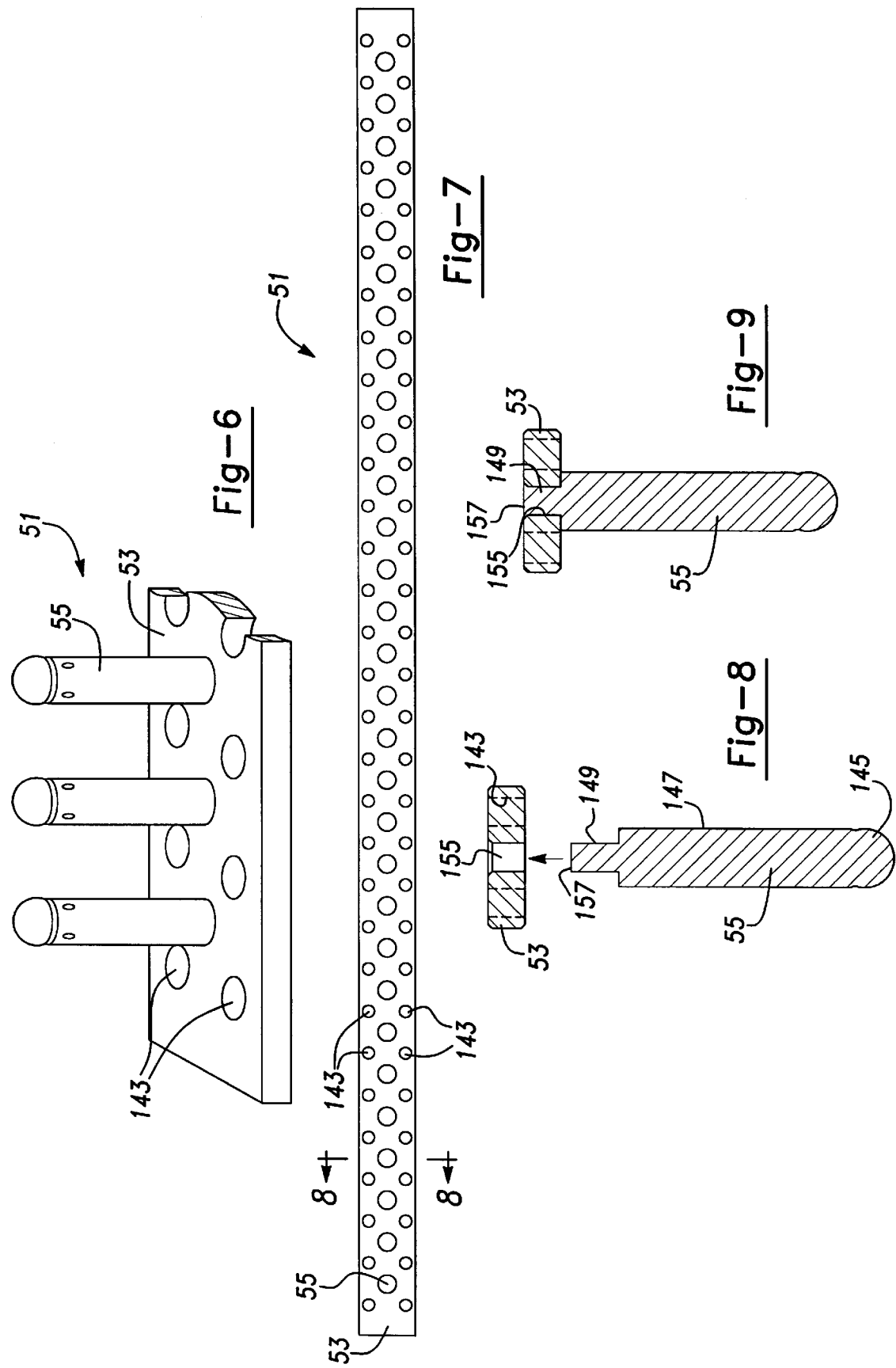

6,000,928

1

CAPSULE MAKING MACHINE HAVING IMPROVED PIN BARS AND AIR FLOW CHARACTERISTICS

BACKGROUND OF THE INVENTION

This invention relates generally to medicinal capsule making machines and specifically to a capsule making machine employing improved pin bars and air flow characteristics.

It is well known to provide a gelatin, hard shell capsule making machine employing pin bars which sequentially move from a preheating station, to a greasing station, dipping/spinning/front elevator station, upper deck heating kiln, rear elevator, lower deck heating kiln, and finally to an automatics section. One such device is disclosed within U.S. Pat. No. 1,787,777 entitled "Capsule Machine" which issued to Colton on Jan. 6, 1931, and is incorporated by reference herewithin.

Most conventional capsule making machines employ pin bars consisting of an elongated base and a plurality of depending pins. The pins are dipped into a liquid gelatin capsule solution at the dipping station. The gelatin capsule solution adheres to the pins and is subsequently dried and hardened within a heated kiln. The hardened capsules are then cut and removed within the automatics station. Thereafter, the automatics station temporarily joins the cap portion of the capsule with the body portion of the capsule. Cellulose capsule making machines are somewhat similar to the gelatin capsule making machines except that cooled pin bars are placed within a relatively hot gelatin capsule solution and then subsequently hardened by cooling in cooling chambers in place of the kilns.

Conventional pin bars have a rectangular cross sectional shape. The pins are typically inserted into a set of openings centrally located within the otherwise solid and unpierced base. This set of openings are longitudinally aligned and adapted to receive a constricted portion of the pins. Such exemplary pins and pin bars are disclosed within U.S. Pat. Nos.: 4,758,149 entitled "Capsule Forming Pin Having a Burnish-Hardened Surface" which issued to Sauter on Jul. 19, 1988; 5,032,074 entitled "Apparatus for Manufacturing Hard Capsules for Medicament Use" which issued to Muto et al. on Jul. 16, 1991; 4,997,359 entitled "Multi-Well Dish for Capsule Making" which issued to Lebrun on Mar. 5, 1991; 4,627,808 entitled "Apparatus for Making Capsule having Plural Chambers" which issued to Hughes on Dec. 9, 1986; and 3,399,803 entitled "Self-Locking Medicament Capsule" which issued to Oglevee et al. on Sep. 3, 1968. The preceding patents are all incorporated by reference herewithin. Solid pin bars are also disclosed within WIPO Patent Publication No. WO 92/21311 entitled "Method and Apparatus for the Manufacture of Pharmaceutical Cellulose Capsules", published on Dec. 10, 1992, and Canadian Patent No. 1 151 823 entitled "Hard Shell Gelatin Capsule Dipping Apparatus and Method" which issued on Aug. 16, 1983.

These traditional solid pin bars retard desired air flow within the drying kilns since hundreds of these pin bars are closely juxtapositioned within the upper deck kiln and the lower deck kiln. Therefore, essentially no heated air can pass through the bases of the pin bars and extremely little heated air can pass between the tightly packed bases. This is schematically shown in FIG. 1 which illustrates one side of a traditional machine. In this figure, heated air is blown from a hood 21 and directed downward upon the upstanding pins 23. This air stream is then deflected to the side of the kiln by the bases of the pin bars such that the air flow is then received by an outlet 25 alongside the kiln. Thus, these solid pin bars do not allow for uniform air flow to the innermost rows of the pins thereby allowing undesired irregularities in the final capsule wall thickness and the like. This leads to inefficient heating, costly scrappage of parts and a less than optimum process control.

A variety of drying duct formations have also been employed with traditional capsule making machines. For example, reference should be made to U.S. Pat. Nos. 1,978,829 entitled "Method and Apparatus for Drying Capsules" which issued to Wilkie on Oct. 30, 1934 and 1,114,325 entitled "Capsule Machine" which issued to Winchester on Oct. 20, 1914. These conventional ducts are often cumbersome and difficult to package within modern capsule making machines. Accordingly, it would be desirable to provide improved pin bars which enhance uniform air flow and heating characteristics. It would also be desirable to employ more easily packaged hoods.

SUMMARY OF THE INVENTION

In accordance with the present invention, a preferred embodiment of a capsule making machine includes a pin bar having a set of passageways disposed so as to allow free passage of fluid through a base. In another aspect of the present invention, the capsule making machine has a dipping station wherein pins are dipped into a capsule solution, and the machine has a capsule hardening station for promoting controlled hardening of said capsule solution upon the pins by flowing fluid generally through bases of the bars from which the pins project. In a further aspect of the present invention, the pin bars are disposed in a preheating station prior to dipping wherein heat is radiated through the passageways in the base of the pin bars. In yet another aspect of the present invention, a hood having a substantially triangular side view shape is disposed within the capsule hardening station for dispersing fluid upon the pin bars to promote hardening of the capsules. Another aspect of the present invention provides specific heating temperature ranges within predetermined section of the capsule hardening station. Methods of constructing a pin bar and for operating a capsule making machine are also provided within the present invention.

The capsule making machine of the present invention is advantageous over conventional machines in that the present invention pin bars allow for fluid flow through passageways within bases of the pin bars. This promotes consistent and uniform drying of the capsules throughout the entire capsule hardening station. The passageways within the pin bars also encourage faster preheating of the pin bars prior to dipping thereby allowing for quicker cycling of the pin bars and improved temperature uniformity from pin bar to pin bar as a group is simultaneously dipped into the capsule solution. All of these fluid flow and heating improvements allow for greater thermal transfer efficiency and improved fluid flow pattern characteristics. This leads to increased uniformity among the finished capsule product thereby reducing part scrappage and reducing manufacturing costs. Due to the high volume nature of the capsules made on these type of machines, reduced product scrappage can be a significant benefit. Improved capsule uniformity in wall thickness and dimensions also reduces jamming of capsules and any associated down time when these capsules are subsequently placed in a medicine filling machine.

Additionally, the triangular side view shape of a hood within the capsule hardening station provides for easier and more compact packaging within the tight confines of the capsule making machine. This specific shape further provides for more highly controlled and localized air flow patterns. Additional advantages and features of the present invention will become apparent from the following description and appended claims, taken in conjunction with the accompanying drawings.

BRIEF DESCRIPTION OF THE DRAWINGS

FIG. 6 is a fragmentary perspective view showing the second preferred embodiment of the present invention pin bar;

FIG. 7 is a top elevational view showing the second preferred embodiment of the present invention pin bar;

FIG. 8 is an exploded cross sectional view, taken along line 8—8 of FIG. 6, showing the second preferred embodiment of the present invention pin bar in a preassembled position;

FIG. 9 is a cross sectional view, taken along line 8—8 of FIG. 7, showing the second preferred embodiment of the present invention pin bar in an assembled condition;

DETAILED DESCRIPTION OF THE PREFERRED EMBODIMENT

Figure 1:
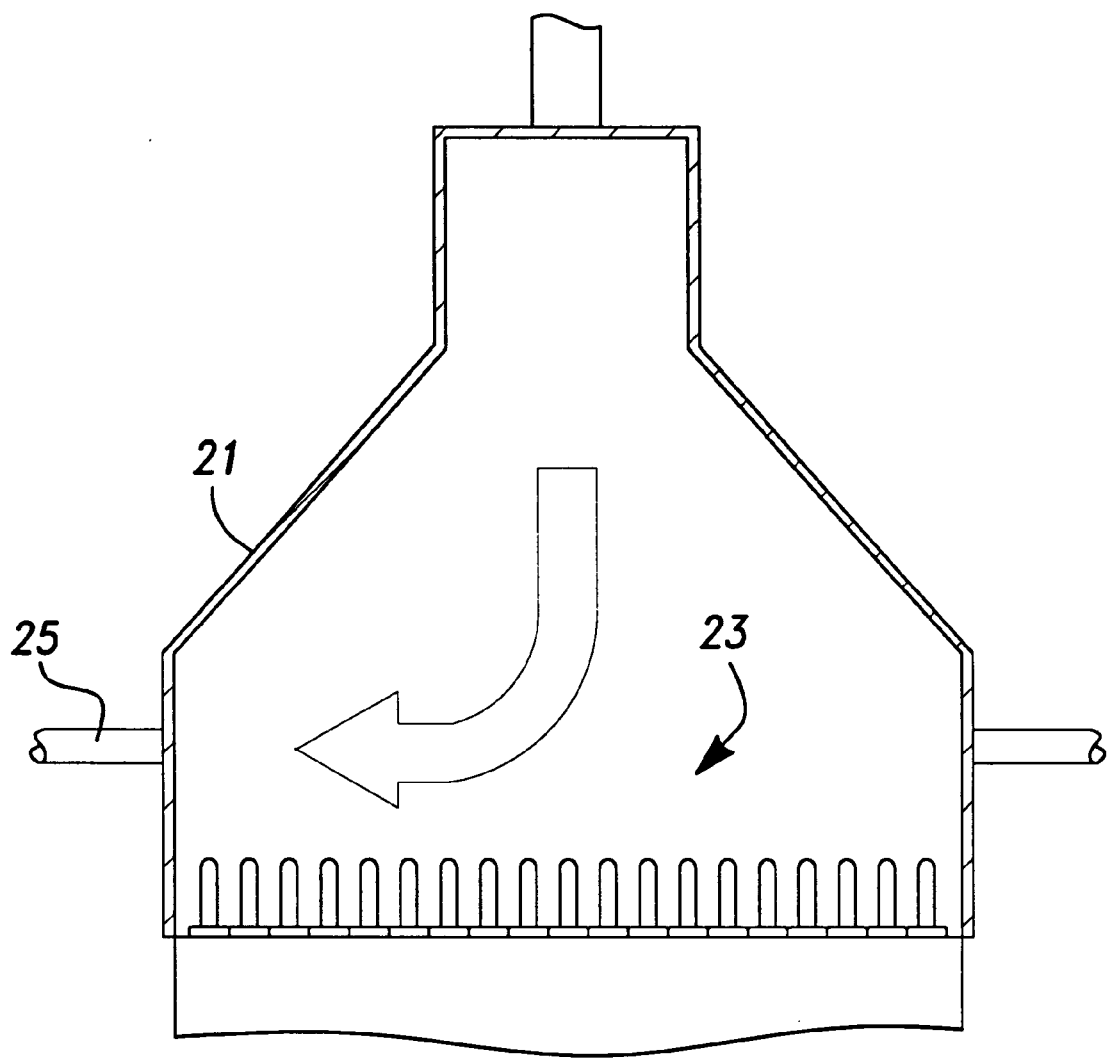
FIG. 1 is schematic cross sectional view showing a prior art air flow pattern within an upper deck kiln of a capsule making machine employing pin bars having solid bases.
Figure 2A:
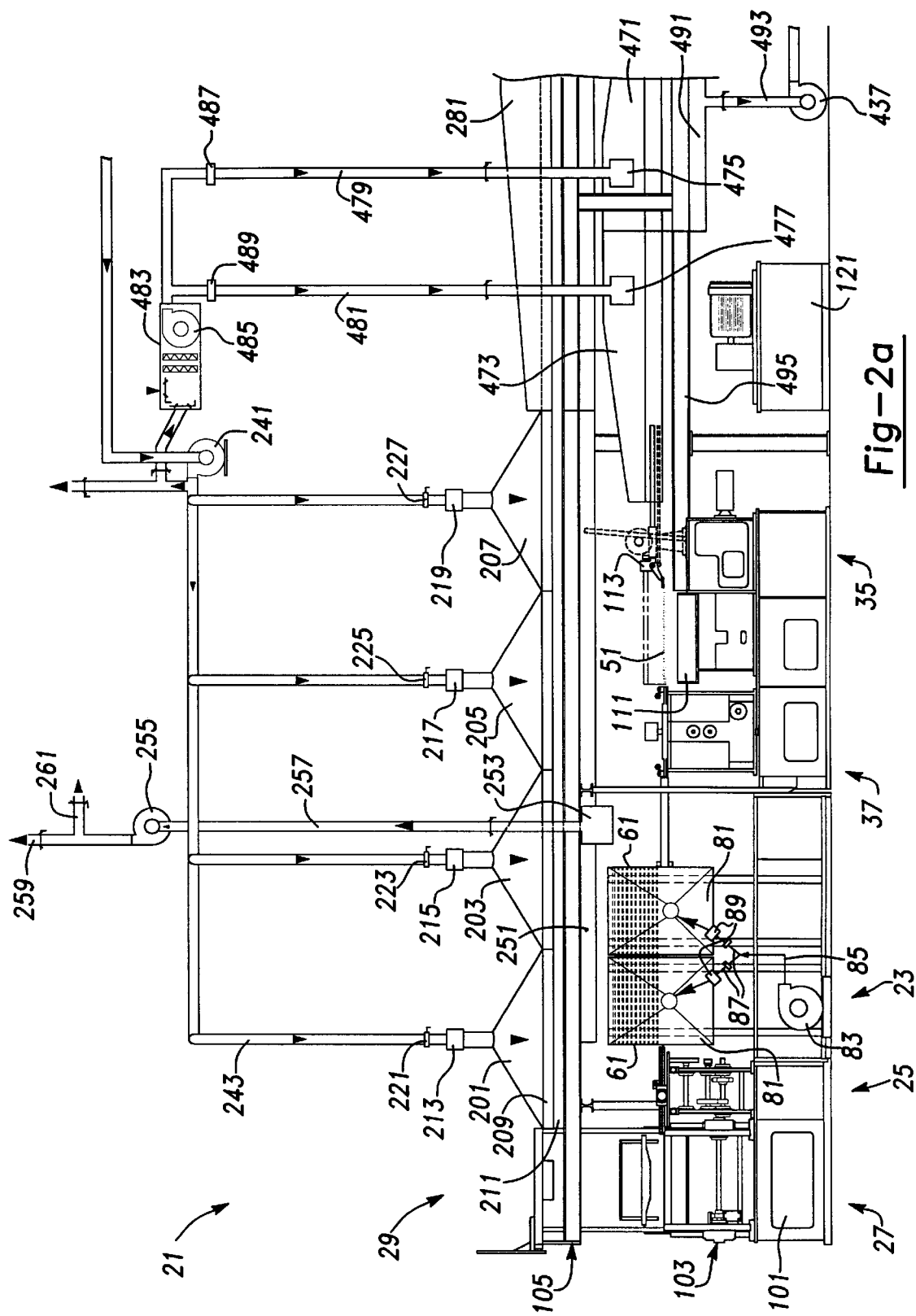
FIGS. 2a and 2b are schematic side elevational views showing the preferred embodiment of a capsule making machine of the present invention.
Figure 2B:
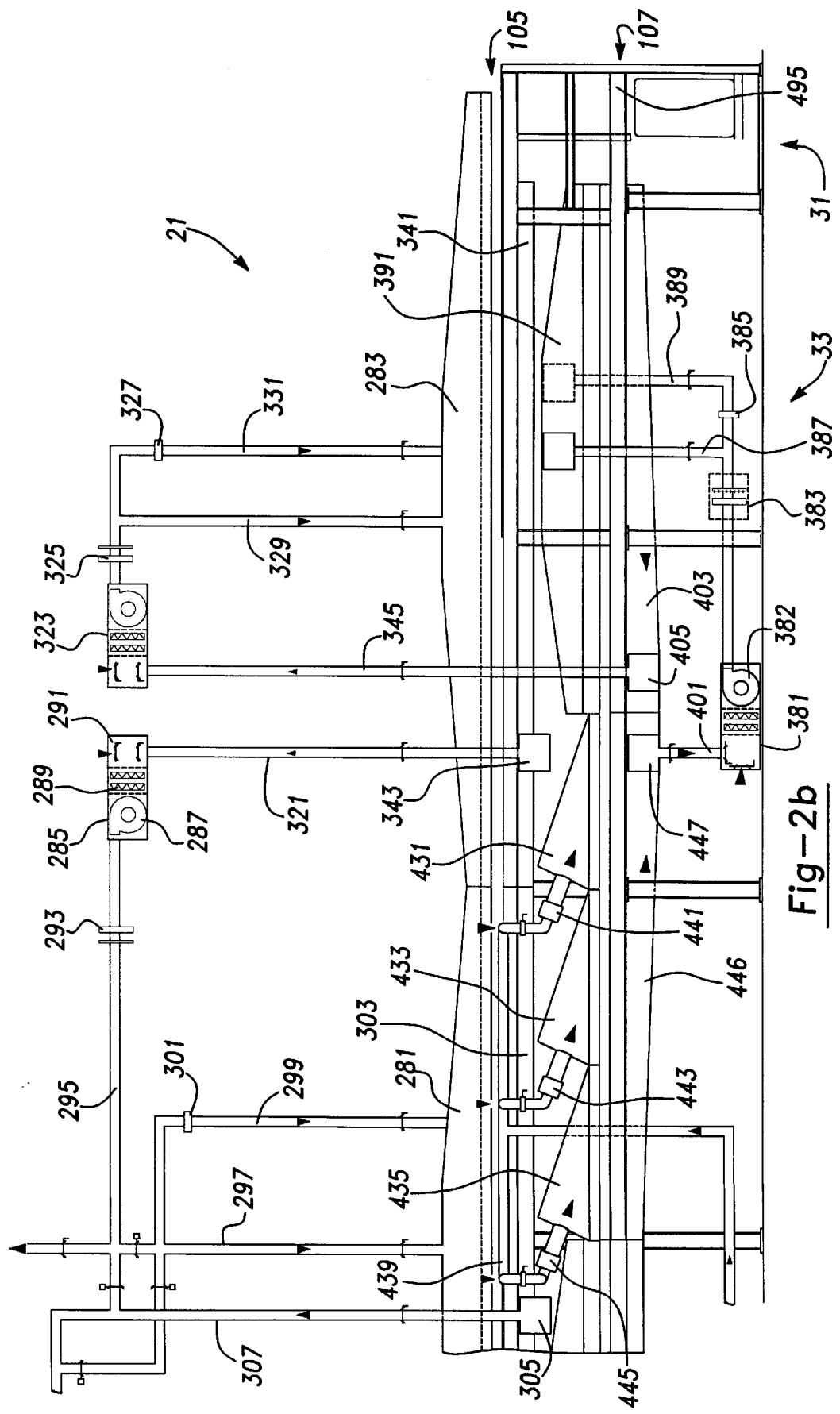

Referring to FIGS. 2a and 2b, the preferred embodiment of a hard gelatin capsule making machine 21 of the present invention sequentially has a preheating station 23, a greasing station 25, a dipping and spinning front elevator station 27, an upper deck capsule hardening or kiln station 29, a rear elevator station 31, a lower deck capsule hardening or kiln station 33, a pin bar collector, table station 35 and an automatics station 37. As each capsule requires a body and a cap, two concurrently operating manufacturing lines are positioned side-by-side in machine 21 such that a like number of bodies and caps are simultaneously produced. Approximately 2,336 pin bars 51 are automatically moved between the various capsule making stations. As is illustrated in FIGS. 2a and 15, each pin bar 51 has a base 53 and a set of pins 55.

Empty pin bars 51 are loaded within slots 57 of a pair of oppositely disposed racks 59 of a pair of preheating elevators 61. Racks 59 are mounted upon base plates 63 which have a series of hot water or oil fluid lines machined therein. Base plates 63 and racks 59 are vertically moved by actuation of hydraulic or pneumatically actuated piston-type cylinders 65, 67 and 69. Accordingly, twenty-four pin bars 51 can be simultaneously preheated within each preheating elevator 61 without increasing the length of the capsule making machine 21. This allows for quick and uniform heating of the pins. Such preheating elevators are more fully disclosed in U.S. patent application Ser. No. 08/834,810, entitled "Heating Elevator for Capsule Making Machine" which was invented by the present inventors, filed on the same date as the present application and is incorporated by reference herewithin.

Figure 10:
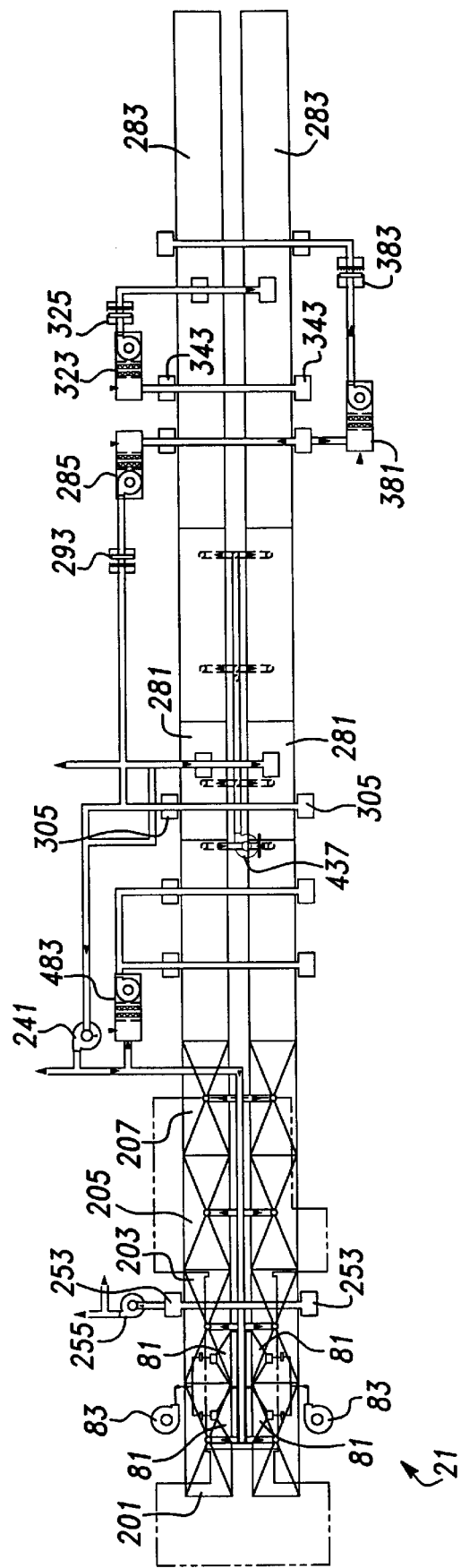
FIG. 10 is a schematic top elevational view showing the preferred embodiment of the present invention capsule making machine.
Figure 11:
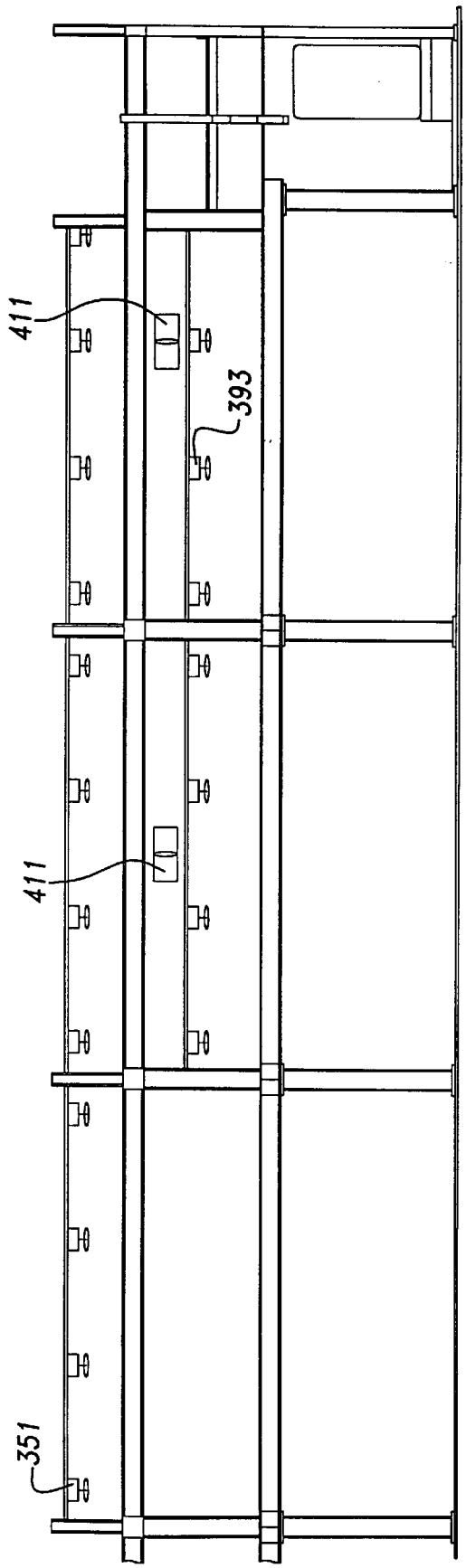
FIG. 11 is a fragmentary and schematic side elevational view showing fans within the preferred embodiment of the present invention capsule making machine.
Figure 15:
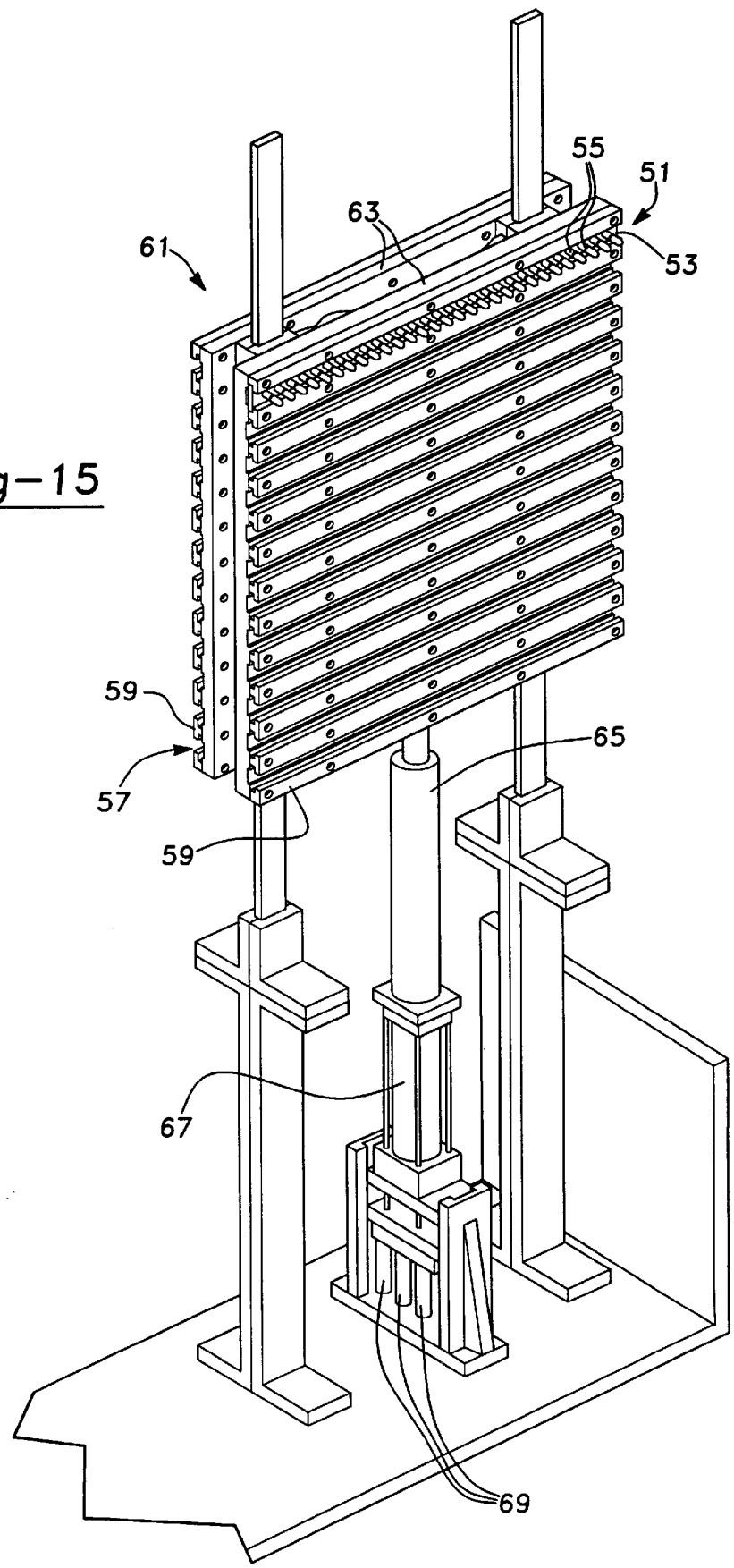
FIG. 15 is a perspective view showing a preferred embodiment of a preheating elevator employed in the present invention capsule making machine.
Figure 16:
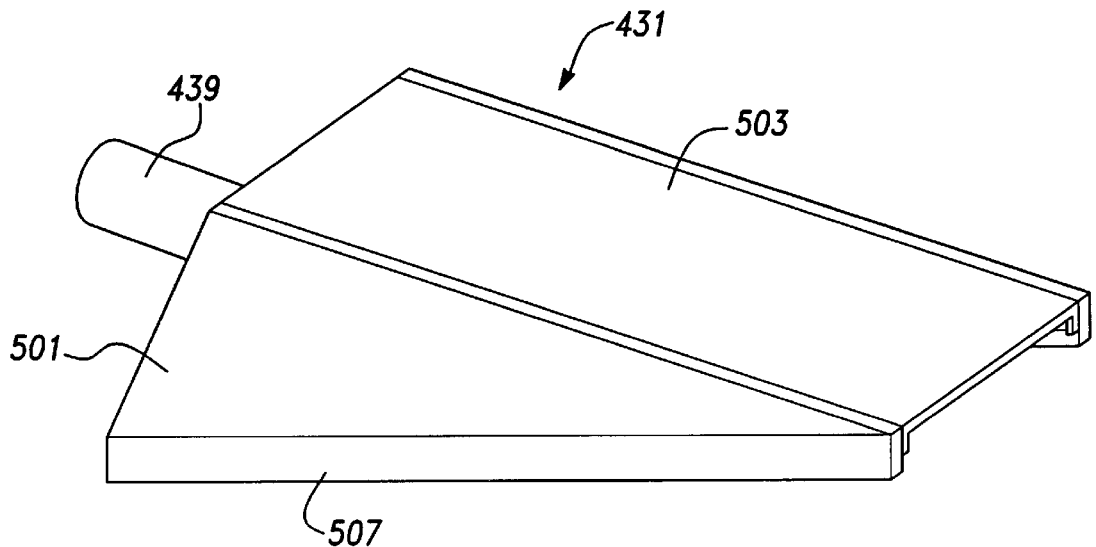
FIG. 16 is a top perspective view showing a preferred embodiment hood of the capsule making machine of the present invention.
Figure 17:
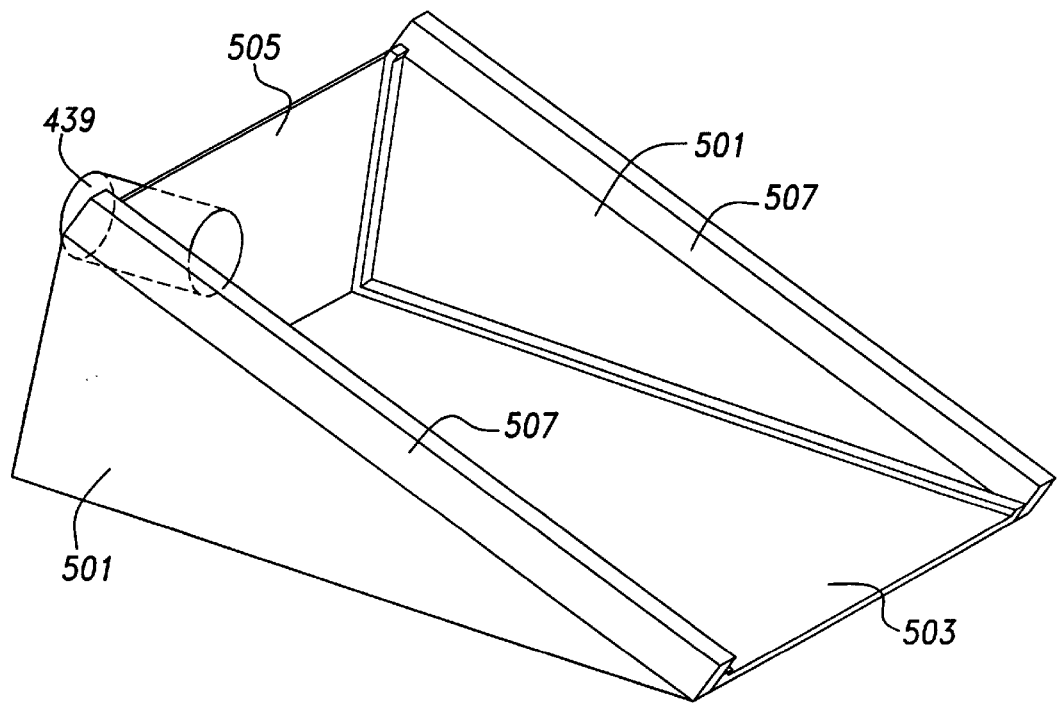
FIG. 17 is a bottom perspective view showing the preferred embodiment hood of FIG. 16, for the present invention capsule making machine.
Figure 18:
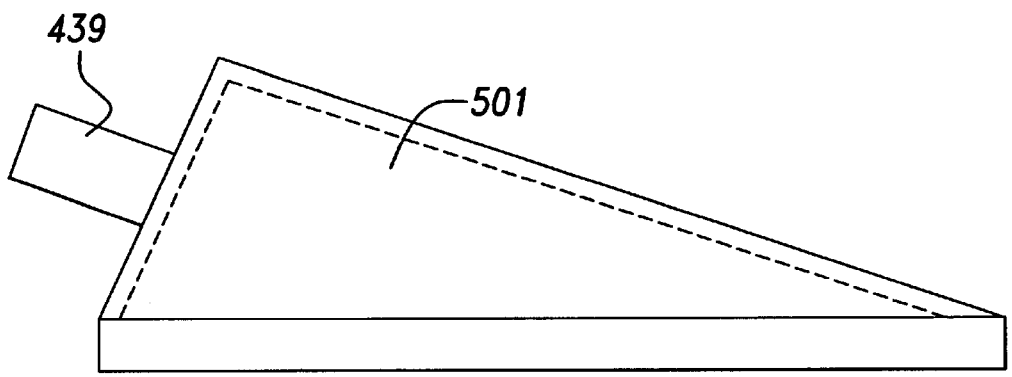
FIG. 18 is a side elevational view showing the preferred embodiment hood of FIG. 16, for the present invention capsule making machine.
Figure 19:
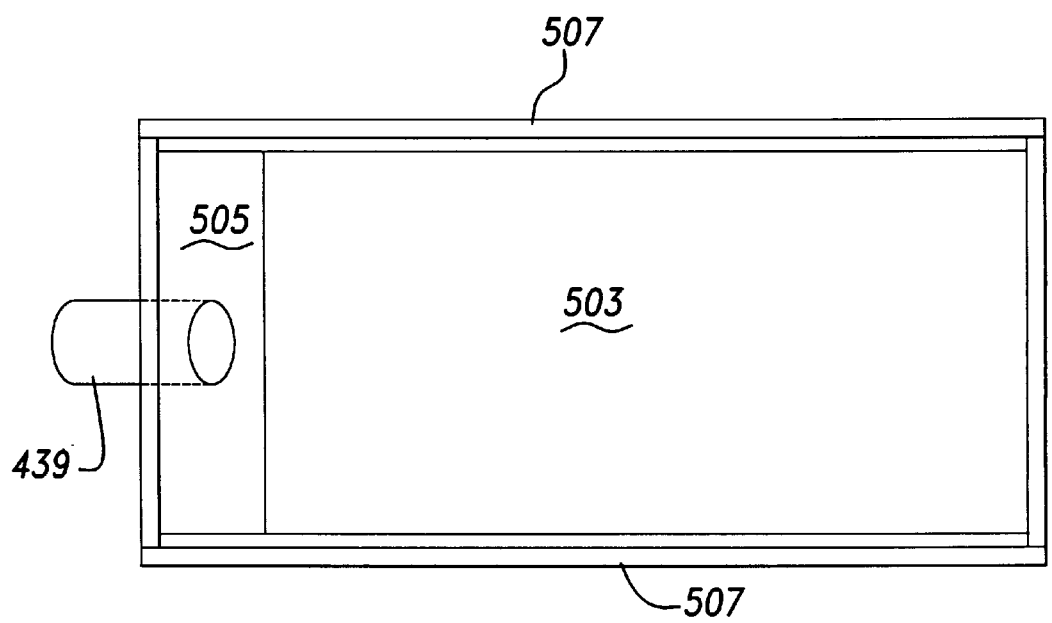
FIG. 19 is a bottom elevational view showing the preferred embodiment hood of FIG. 16, for the present invention capsule making machine.

FIGS. 2a and 10 illustrate an external heating assembly having a funneled air plenum 81 movably associated with each rack 59 (see FIG. 15). A 5,000 cfm (cubic feet per minute) blower unit 83 blows air through a primary air duct 85, a branched pair of secondary air ducts 87 and through a pair of heaters 89, coupled to plenums 81 associated with each side of preheating elevators 61.

Returning to FIG. 2a, a felt pad lined lubricating shell is aligned with each pin of pin bar 51 at greasing station 25. The pads contain a pharmaceutically neutral lubricant such as mineral oil. The shells are then placed over their respective pins and rotated to provide a lubricating coating so as to allow for the expeditious removal of the formed bodies and caps later in the process. The felt pads of the lubricating shell uniformly spread the lubricant onto each of the pins.

The capsule solution or composition is transferred into a stainless steel receiving or holding tank (not shown) after the solution is inspected and prepared to bring it to the recommended consistency. From the receiving tank, the capsule solution is moved into a transfer or feed tank (not shown), typically composed of stainless steel and having a large holding capacity, such as 18.49 gallons (70 liters). The transfer tank is water-jacketed and heated to maintain the required range of capsule solution temperature so as to provide desired flow characteristics. Appropriate coloring dyes are selectively added to the solution while in the transfer tank. Both the viscosity and temperature of the solution must be within relatively narrow specified limits to ensure proper quality during the molding or forming sequence. The solution in the feed tank is kept under controlled temperatures for a few hours before being transferred to the manufacturing room.

The molten liquid solution is delivered to a dipping tank 101 of dipping station 27. A heater (not shown) in dipping tank 101 maintains the appropriate temperature throughout the manufacturing operation. A continuous flow of a hot fluid, such as water, is supplied through tank 101 by circulating pumps (not shown) provided in association with the heater. Automatic viscosity controls and a solution distribution system continuously monitor the flow and level of the capsule-forming solution in the dipping pans which insure precise capsule wall thickness.

Figure 12:
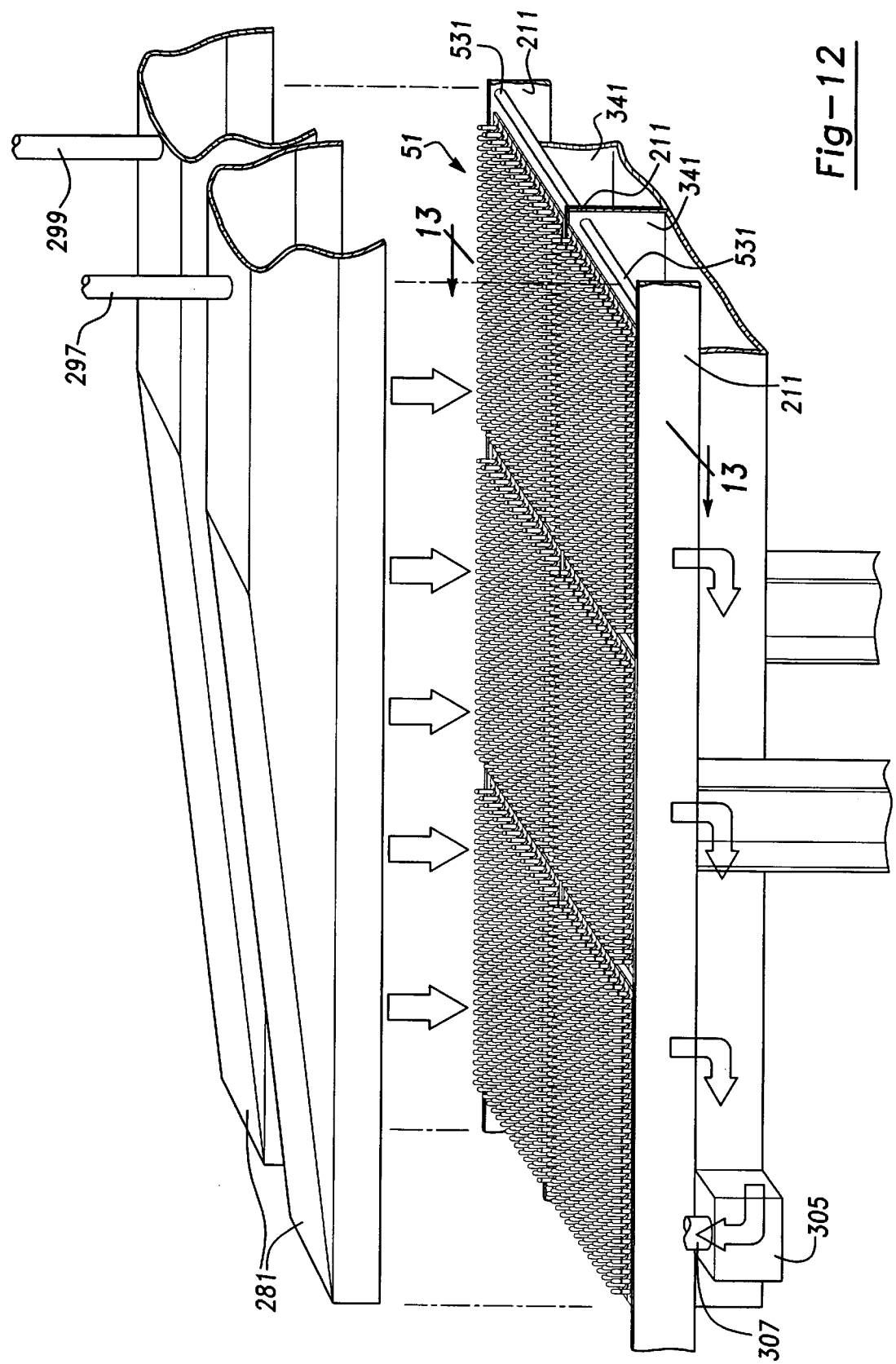
FIG. 12 is a fragmentary and partially exploded perspective view of an upper deck kiln of the present invention capsule making machine.

A predetermined group of five, six or seven pin bars 51 are juxtapositioned laterally next to each other between a pair of slotted disks of a spinner 103. The loaded spinner 48 is slowly lowered at a specific speed to a precisely regulated depth; thus, the capsule solution coats the ends of the pins to a preselected depth. The coated pin bars are withdrawn and then rotated one and a half rotations so that the pins are facing upward. The rotation of the pin bars on the spinner 103 assures uniform wall thickness of the capsule portions and prevents excessive accumulations of solution at the dome-shoulder of the capsules. The coated pin bars 51 are elevated to an upper deck 105 via front elevator/spinner 103 and then pushed from spinner 103 onto upper deck 105. Thereafter, pin bars 51 are grouped, side-by-side, for horizontal and longitudinal movement along upper deck 105 for passage through the heating kilns of capsule hardening station 29; this is also shown in FIG. 12.

FIG. 2b further shows rear elevator 31 which lowers a grouping of pin bars 51 from upper deck 105 to a lower deck 107, whereupon, this block of pin bars 51 moves in a horizontal and longitudinal direction opposite that taken on upper deck 105. Pin bars 51 then pass through the heated kilns of lower deck capsule hardening station 33 and then to table section 35. Table section 35 accumulates the blocks of pin bars 51. A middle elevator 111 singles out and reorients each pin bar 51 so that a center bar pusher 113 provides longitudinal sliding movement to each pin bar 51.

Finally, the coated pin bars 51 are delivered to automatics station 37 wherein the caps and bodies are stripped from the pins on which they have been formed, cut to the required lengths, preassembled into empty capsules and removed from the machine. Automatics station 37 employs a plurality of clothespin-like strippers (not shown) each having a pivot and a compression spring biasing a pair of legs. A head of each stripper is biased toward a closed position surrounding each pin immediately adjacent to the base of pin bar 51. This allows the strippers to be moved along the length of the pins so as to push off the formed and trimmed capsules portions. Prior to the pushing action of the stripper, a rotating knife (not shown) trims the open end of each corresponding capsule portion to create a clean open edge. The empty pin bars 51 are then moved again to preheating station 23 and the cycle repeats itself. The mechanical devices within each station are driven by a hydraulic unit 121 and a programmable controller (not shown).

Figure 3:
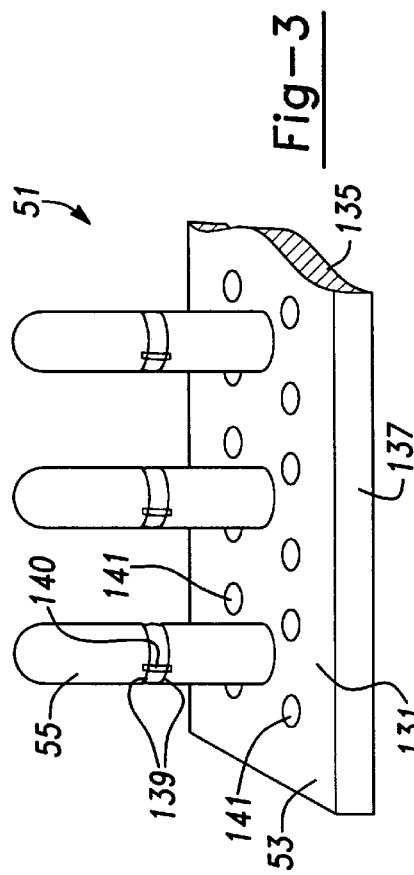
FIG. 3 is a fragmentary perspective view showing a first preferred embodiment of a pin bar of the present invention.
Figure 4:
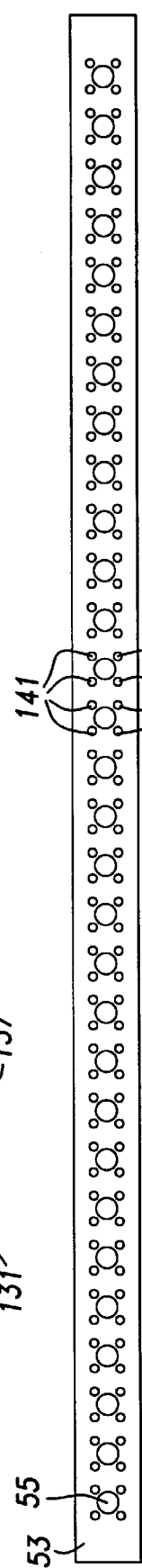
FIG. 4 is a top elevational view showing the first preferred embodiment of the present invention pin bar.

Referring now to FIGS. 3 and 4, a first preferred embodiment of pin bar 51 of the present invention includes an elongated base 53 and a set of perpendicularly extending pins 55. Base 53 has a generally rectangular cross-sectional configuration and is preferably made from stainless steel, type 416MX. Base 53 has a flat upper surface 131 and a flat lower surface 135 joined by a flat peripheral edge 137. The corners joining edge 137 with surfaces 131 and 135 may be chamfered or radiused. Accordingly, base 53 has a somewhat rectangular cross section. A set of passageways 141 are machined completely through the thickness of base 53. In the presently preferred embodiment, passageways 141 are laterally and longitudinally offset from pins 55. Furthermore, the embodiments of FIGS. 3 and 4, show at least four passageways 141 being longitudinally disposed between each adjacent pair of pins 55. Moreover, each pin 55 is diagonally disposed between a pair of passageways 141. Each passageway 141 is oriented such that a centerline extending therethrough is parallel to each pin 55.

There are thirty pins 55 on each pin bar 51 for capsule sizes 0 (shown), 1, 2, 3 and 4, and twenty-two pins per pin bar for capsule size 00. In the first preferred embodiment, there are four passageways 141 per pin 55.

Figure 5:
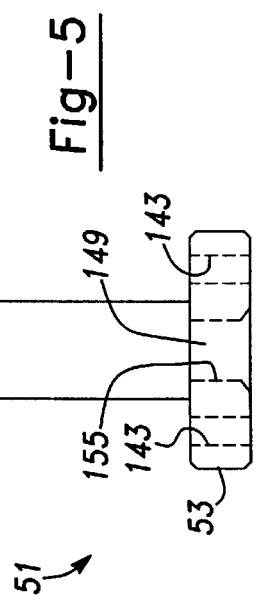
FIG. 5 is an end elevational view showing a second preferred embodiment of a pin bar of the present invention.

The second preferred embodiment of pin bar 51 of the present invention, shown in FIGS. 5–7, includes a set of passageways 143 which are longitudinally and laterally offset from each pin 55. However, with this embodiment, only a pair of passageways 143 are longitudinally disposed between each adjacent pair of pins 55. Further, in this second embodiment, the diameter of each passageway 143 is larger than that of passageways 141 (see FIG. 4) of the first preferred embodiment. Otherwise, the second preferred embodiment is identical to that of the first preferred embodiment.

FIGS. 5, 8 and 9 illustrate the pin and base manufacturing sequence. Pin 55 has a partially spherical distal end 145, an elongated and substantially circular-cylindrical intermediate segment 147 and a constricted proximal end 149. Pins 55 are machined on a screw machine from an elongated and cylindrical rod. The ends and intermediate segments are machined to the desired shapes and then each pin is severed from the rod. Further burnishing and polishing may be required. Each pin is made from stainless steel, type 303MX which is an 18-8 chromium-nickel stainless steel, modified by the addition of sulphur as well as phosphorus. The 416MX stainless steel of the pin bars is a chromium grade of stainless steel modified by the addition of phosphorus and sulphur.

Base 53 further has a set of laterally centered openings 155 extending completely through the thickness of base 53. These openings 155 are machined into base 53 by a milling machine as are passageways 143. Each opening 155 has a cylindrical section and a frusto-conical section. Passageways 141 (see FIG. 4) and 143 have diameters smaller than openings 155. Constricted end 149 of each pin 55 is inserted into opening 155. When fully inserted, surface 157 of pin 55 is punched and outwardly expanded, thereby forming a head, to fill up the frusto-conical section of opening 155 and retain pin 55 to base 53. This is essentially a riveting type action.

Pin 55 of FIG. 5 is shown as a cap forming pin such that partially spherical proximal end 145 has a radius slightly larger than intermediate section 147. This pin 55 further has a single circumferential groove 151 and a series of locking formations 153. Pin 55 of FIG. 3, is for a body capsule portion such that the intermediate section contains a pair of circumferential grooves 139 and a pair of air channels 140. Of course, other shapes may be employed.

The upper deck kilns within capsule hardening station 29 will now be described in greater detail, while referring to FIGS. 2a, 2b and 10–13. Four generally tetrahedron-shaped hoods 201, 203, 205 and 207 are disposed immediately above the first portion of each side of upper deck 105. Each hood 201–207 has a pair of laterally outboard flanges 209 which attaches to corresponding side rails 211. Heaters 213, 215, 217 and 219, and drains 221, 223, 225 and 227 are coupled to inlets of hoods 201, 203, 205 and 207, respectively. A 1600 cfm, 8.5 inch psi (pounds per square inch) blower 241 pushes a fluid, herein-air, through a series of three inch diameter inlet ducts, through heaters 213–219, and then into hoods 201–207. Humidifiers (not shown) are also coupled to each hood 201–207. Accordingly, the air within hood 201 is heated to 250° Fahrenheit, the air within hood 203 is heated to 245° Fahrenheit, the air within hood 205 is heated to 240° Fahrenheit while the air within hood 207 is heated to 235° Fahrenheit. The humidity level is preferably 98 or 99° within hood 201 and the humidity is decreased by about 5% in each subsequent hood. The air is blown through ducts 243 at 125 cfm. The temperature, air flow and humidity must be closely controlled within hoods 201–207 due to the still liquid state of the capsule solution coating the pins. A set of radiant panels (not shown) are disposed within the tunnel formed by hoods 201 and 203 adjacent to side rails 211. These radiant panels use electric tool heaters.

A trough 251 is disposed beneath hoods 201–207 for gathering the expelled air and transmitting same to an outlet 253. Outlet 253 is coupled to a blower 255 by way of an outlet duct 257. Blower 255 causes the exhausting air to flow through duct 257 at 1600 cfm and then to exit into the environment at stack 259 and/or into the plant atmosphere at pipe 261.

A pair of trapezoidal-shaped hoods 281 and 283 are respectively positioned down-line from hood 207 for each body and cap line. A heat recovery and exchange unit 285, including a blower 287, a set of filters 289 and cooling coils 291, force air through heaters 293 by way of ducts 295, 297 (cap portion) and 299 (body portion) to hoods 281. Blower 287 is of a two-horsepower variety capable of pushing air at 2,000 cfm and 3.5 psi. Accordingly, air flows through ducts 297 and 299 at 400 cfm. A heater, such as 301, heats air in ducts 297 and 299. A trough 303 is also disposed below hood 281 for gathering the expelled air which an outlet 305 collects and transmits, at 400 cfm, through a duct 307 which is joined to blower 241. Air enters heat recovery and exchange unit 285 through an exhaust outlet 321, flowing at 2,000 cfm, and from the implant atmosphere.

Another heat recovery and exchange unit 323, like that of unit 285, blows air through heaters 325, through heater 327 and through ducts 329 (cap portion) and 331 (body portion). The air flowing through ducts 329 and 331 is received and distributed within hoods 283. The distributed air is gathered within a trough 341 and received within an outlet 343 for transfer to duct 321. Air is received within heat recovery and exchange unit 323 at 1200 cfm from duct 345 and the in-plant atmosphere. A series of vertical fans 351 are disposed within hoods 281 and 283 to further distribute the air expelled therefrom. The air exiting hood 281 is heated to 220° Fahrenheit and the air exiting hood 283 is heated to 210° Fahrenheit.

A further heat recovery and exchange unit 381 employs a two-horsepower blower 383 which pushes 1200 cfm of air at 3.5 psi through heaters 382 and 385 along inlet ducts 387 (cap portion) and 389 (body portion) which enters the sides of the lower deck 15 trapezoidal-shaped hoods 391. A set of vertical fans 393 are also disposed within hood 391. Six inch or eight inch diameter horizontal fans 411 are disposed within troughs 303 and 341 to improve the exiting air flow characteristics. The air being distributed from hood 391 is heated to 200° Fahrenheit. Air entering heat recovery and exchange unit 381 is received from outlet duct 401 and the in-plant atmosphere. An offset-ramped trough 403 is disposed below hood 391 for collecting the expelled air such that outlet 405 transfers the collected air and transmits same to outlet duct 345.

Three triangularly-shaped hoods 431, 433 and 435 are positioned down-line from hood 391. The specific configuration of these hoods 431–435 will be described in further detail hereinafter. A blower 437, adapted to blow air at 800 cfm and 8.5 psi, is coupled to branched inlet ducts 439 which each have heaters 441, 443 and 445. The air, heated to a temperature range of 180–160° Fahrenheit is then pushed downstream into hoods 431–435 for distribution. An offset ramped trough 446 is disposed below hoods 431–435 for collecting the distributed air which is then received within an outlet 447 coupled to outlet duct 401.

Finally, a pair of offset ramped hoods 471 and 473 (for each of the cap and body lines) receive heated air, by way of side mounted inlets 475 and 477, respectively, which are coupled to inlet ducts 479 and 481 which flow air at 400 cfm. A heat recovery and exchange unit 483 employs a blower 485, adapted to provide 1,600 cfm and 3.5 psi, which blows the incoming air through heaters 487 and 489 and then along ducts 479 and 481. The air exiting hoods 471 and 473 is heated to 150° Fahrenheit. The air distributed from hood 471 is gathered within a trough 491 which is coupled to an outlet duct 493 joined to blower 437. Radiant heating panels are also disposed within hoods 471 and 473 along side lower deck side rails 495.

Hoods 431–435 all have identical configurations such that exemplary hood 431 will be further described as follows. Referring now to FIGS. 16–19, hood 431 has a pair of scalene triangular side walls 501 joined by a rectangular top 503, elongated in an in-line or longitudinal direction and a rectangular base 505, elongated in a lateral direction. An elongated rectangular flange 507 downwardly projects from each side wall 501. Inlet duct 439 is affixed to base 505. The hoods and troughs are preferably made from sheets of aluminum and are riveted or otherwise fastened together.

Figure 13:
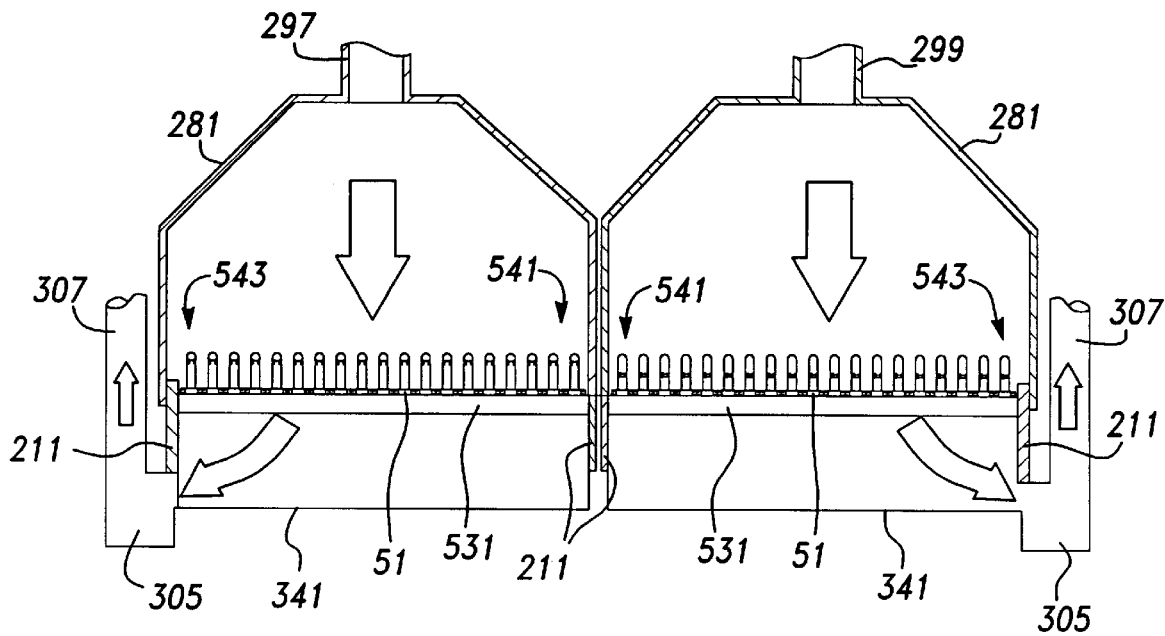
FIG. 13 is a cross sectional view, taken along line 13—13 of FIG. 12, showing the preferred embodiment upper deck kiln of the capsule making machine of the present invention employing the second preferred embodiment pin bars of the present invention.
Figure 14:
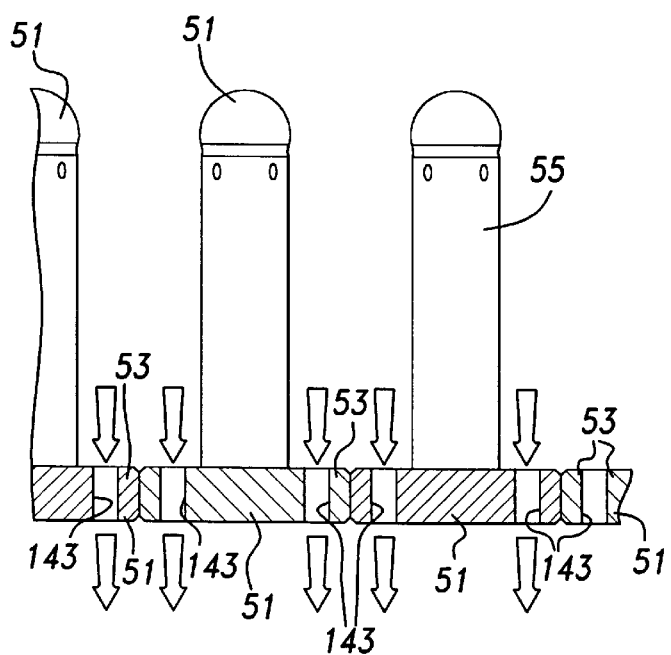
FIG. 14 is an enlarged and fragmentary cross sectional view, taken along line 13—13 of FIG. 12, showing air flow patterns through passageways within the second preferred embodiment of the present invention pin bars.

Referring now to FIGS. 12–14, it can be observed that the heated air exiting inlet ducts 297 and 299 is distributed in a generally downward direction, with some helical flow due to the vertical fans. This heated air then flows through openings 143 within the closely packed blocks of pin bars 51. There are approximately 624 pin bars within the upper deck. Therefore, the air flow would glance sideways off of the pin bar bases 53 if it were not for the use of passageways 143.

A multitude of supporting rollers 531 laterally extend across essentially the entire upper deck and the capsule hardening station of the lower deck. Rollers 531 are longitudinally spaced apart from each other such that the generally vertical air flow through bases 53 of pin bars 51 is not substantially impeded. The air is then collected below pin bars 51 within trough 341. This air flow pattern allows for much more uniform heating and, therefore, drying of the body and cap portions disposed on pin bars 51. Accordingly, the heat, humidity and air flow passing through the innermost rows 541 of pin bars 51 are much closer to the same temperature, humidity and air flow passing through the outermost rows 543 of pin bars 51. These air flow patterns also reduce turbulent and stationary air flow masses within the kilns such that more efficient and lower cost heating and blowing is achieved.

While the preferred embodiments of the capsule making machine of the present invention have been illustrated and described, it is envisioned that alternate configurations may also incorporate aspects of the present invention. For example, other passageway patterns and paths may be created within the pin bar base. Furthermore, the pin bar base or pins may have shapes differing from that disclosed. Moreover, while air has been disclosed as the preferred heating fluid passing through the pin bar passageways, other liquid or gaseous fluids may also be passed through the pin bar bases within the capsule making machine. The present invention pin bars may also be used in combination with other conventional preheating devices. Finally, other blower, heating, ducting, hood and trough arrangements may be used as long as the results of the present invention are achieved. Various materials and air flow rates have been disclosed in an exemplary fashion, however, other materials and air flow rates may of course be employed. It is intended by the following claims to cover these and any other departures from the disclosed embodiments which fall within the true spirit of this invention.

The invention claimed is:

1. A pin bar for a capsule making machine comprising:

a base having a top surface and a bottom surface joined by peripheral edges, at least one of said surfaces being substantially flat, said base further having at least 40 fluid passageways extending between said surfaces, said base having a substantially rectangular cross section; and at least 20 pins projecting from said base substantially perpendicular to said top surface, each of said pins having a partially spherical distal end, elongated centerlines of said passageways being aligned substantially parallel to elongated centerlines of said pins, said pins substantially projecting along a single longitudinal plane, said passageways being offset from said pins and at least a majority of said passageways being laterally offset from said plane.

2. The pin bar of claim 1 wherein:

said base further includes a set of openings corresponding to the number of said pins;

each of said pins includes:
 (a) a partially spherical distal end;
 (b) an elongated and substantially cylindrical intermediate segment;
 (c) a constricted proximal end being disposed within a corresponding one of said set of openings; and
 (d) a section of said proximal end being expanded beyond a lateral size of said corresponding opening thereby securing said pin to said base.

3. The pin bar of claim 1 wherein a diameter of each of said passageways is smaller than a diameter of each of said set of openings.

4. The pin bar of claim 1 wherein at least a pair of said passageways are longitudinally disposed substantially between each adjacent pair of said pins.

5. The pin bar of claim 1 wherein at least four of said passageways are longitudinally disposed substantially between each adjacent pair of said pins.

6. The pin bar of claim 1 wherein four of said passageways border each of said pins in a repeating manner.

7. The pin bar of claim 1 wherein each of said pins is diagonally disposed between a pair of said passageways.

8. The pin bar of claim 1 wherein all of said passageways are laterally offset from said plane of said pins.

9. In combination, capsule forming bars and a capsule making machine, said combination comprising:

said capsule forming bars having a single row of capsule forming surfaces and having internal passageways;

wherein there are more of said passageways than said capsule forming surfaces, at least a majority of said passageways are offset from said single row;

a dipping station containing a capsule solution, said bars being movable to said dipping station for receiving a predetermined amount of said capsule solution;

a capsule hardening station receiving said bars and promoting controlled hardening of a predetermined amount of said capsule solution disposed upon said bars; and supporting members being located within said capsule hardening station acting to support said bars, fluid flowing substantially through said bars and said supporting members when said bars are disposed at said capsule hardening station.

10. The machine of claim 9 further comprising:

a hood being disposed above said bars at said capsule hardening station; and a trough being disposed below said bars at said capsule hardening station;

wherein said fluid is defined as air passing from said hood, through said bars, through said supporting members and to said trough.

11. The machine of claim 10 further comprising:

a blower blowing said air into said hood;

a heater heating said air entering said hood;

a fan circulating said air in said hood; and a preheating station heating said bars prior to entry of said bars in said dipping station;

said capsule solution being defined as a gelatin capsule solution;

whereby said bars are heated prior to entering said dipping station, are dipped into said gelatin capsule solution, and are subsequently heated and dried within a kiln defining said capsule hardening station.

12. The machine of claim 9 further comprising:

a set of pins defining the capsule forming surfaces, extending from a base of each of said bars;

a bar greasing station applying a lubricant upon said set of pins; and an automatics station for removing said hardened capsule solution from said set of pins.

13. The machine of claim 12 wherein said capsule hardening station is located at least in part within an upper deck disposed above said automatics and greasing stations.

14. The machine of claim 9 wherein said support members are a plurality of rollers disposed below said bars, said plurality of rollers are spatially separated from each other so as to allow substantially uninterrupted air flow therebetween.

15. The machine of claim 9 wherein said bars include at least 400 bars simultaneously disposed within said capsule hardening station.

16. A capsule making bar comprising:

a metallic base having opposing surfaces, said base having a substantially rectangular cross sectional shape, said base further having an elongated longitudinal dimension greater than a width dimension and greater than a thickness dimension;

a single row of capsule forming surfaces located on said base; and passageways extending between said opposing surfaces of said base, said passageways being arranged adjacent said capsule forming surfaces;

wherein there are more of said passageways than said capsule forming surfaces, at least a majority of said passageways are offset from said single row.

17. The bar of claim 16 wherein said opposing surfaces are larger than peripheral sides connecting said opposing surfaces.

18. The bar of claim 16 wherein said opposing surfaces are substantially flat.

19. The bar of claim 16 wherein said capsule forming surfaces are pins projecting from said base.

20. The bar of claim 16 wherein the majority of said passageways are laterally offset from a plane intersecting and parallel to a direction of elongation of said capsule forming surfaces.

21. The bar of claim 16 being operable to shape substantially hard medicinal capsule shells upon said capsule forming surfaces.

* * * * *

UNITED STATES PATENT AND TRADEMARK OFFICE
CERTIFICATE OF CORRECTION

PATENT NO. : 6,000,928
DATED : Dec. 14, 1999
INVENTOR(S) : Victorov et al.

It is certified that error appears in the above-identified patent and that said Letters Patent is hereby corrected as shown below:

Column 7, line 38, "implant" should be --in-plant--.

Signed and Sealed this

Eighth Day of August, 2000

Attest:

Q. TODD DICKINSON

*Attesting Officer*　　　　*Director of Patents and Trademarks*